United States Patent [19]
Idogawa et al.

[11] Patent Number: 5,942,560
[45] Date of Patent: *Aug. 24, 1999

[54] COLORED RESIN FINE PARTICLE WATER BASE DISPERSION LIQUID FOR WATER BASE INK

[75] Inventors: Hiroyuki Idogawa; Yasuaki Ogiwara, both of Urawa; Atsushi Iwasa, Tano-gun; Kiyokazu Sakurai, Kodama-gun, all of Japan

[73] Assignee: Mitsubishi Pencil Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/907,189

[22] Filed: Aug. 6, 1997

[30] Foreign Application Priority Data

| Sep. 2, 1996 | [JP] | Japan | 8-232274 |
| Sep. 2, 1996 | [JP] | Japan | 8-232276 |
| Sep. 3, 1996 | [JP] | Japan | 8-233387 |
| Sep. 3, 1996 | [JP] | Japan | 8-233388 |
| Nov. 14, 1996 | [JP] | Japan | 8-303132 |
| Nov. 14, 1996 | [JP] | Japan | 8-303133 |
| Nov. 14, 1996 | [JP] | Japan | 8-303134 |
| Nov. 14, 1996 | [JP] | Japan | 8-303135 |
| Dec. 4, 1996 | [JP] | Japan | 8-323815 |
| Jan. 14, 1997 | [JP] | Japan | 9-004642 |

[51] Int. Cl.$^6$ ................................ G09K 7/00
[52] U.S. Cl. .................................... 523/161
[58] Field of Search ........................ 523/161

[56] References Cited

U.S. PATENT DOCUMENTS

| 4,016,133 | 4/1977 | Hyosu | 526/273 |
| 4,612,343 | 9/1986 | Okuzono | 524/547 |
| 4,623,689 | 11/1986 | Shintani | 524/543 |
| 4,680,332 | 7/1987 | Hair | 524/562 |
| 5,393,637 | 2/1995 | Kanda | 430/138 |
| 5,594,067 | 1/1997 | Doi | 524/806 |
| 5,661,197 | 8/1997 | Villiger | 523/161 |

*Primary Examiner*—Paul R. Michl
*Attorney, Agent, or Firm*—Darby & Darby

[57] ABSTRACT

Provided is a colored resin fine particle water base dispersion liquid which can be a base material for an ink causing no precipitates and having storage stability. Further provided is a water base ink composition for an ink jet recording apparatus or a water base ink composition for a writing tool capable of providing recorded images or written characters and drawn lines which are clear and neither are blurred nor disappear due to water and sweat and which are so excellent in light fastness that they are not deteriorated over a long period of time, wherein the colored resin fine particle water base dispersion liquid is produced by mixing a water soluble basic dye with a mixed vinyl monomer containing a vinyl monomer having an acid functional group and emulsion-copolymerizing the above mixture.

28 Claims, No Drawings

COLORED RESIN FINE PARTICLE WATER BASE DISPERSION LIQUID FOR WATER BASE INK

BACKGROUND OF THE INVENTION (1) Field of the Invention

The present invention relates to a colored resin fine particle water base dispersion liquid for a water base ink which is a base material for ink, and a water base ink composition which does not cause blur in writing and is useful for writing tools such as a sign pen and a ball point pen or an ink jet recording apparatus.

(2) Description of the Prior Art

Dyes and pigments are known as coloring components for water base inks which are used for writing tools such as a water base sign pen and a water base ball point pen.

Inks using dyes have the problems that because of water solubility of the dyes, the written characters and the drawn lines are blurred or disappear due to sweat and water to make the written characters and the drawn lines indistinct. That is, they are inferior in waterproof. Further, dyes themselves are inferior in light fastness and therefore have the problem that the written characters and the drawn lines are deteriorated during a long period of time.

On the other hand, inks using pigments have no problems on waterproof and light fastness, but the pigments coagulate or settle down during a long period of time to cause the problems of clogging at pen points, inferior writing and the like. Further, pigments are required to be finely dispersed in inks for writing tools, and therefore it is difficult to disperse various color pigments to increase the number of colors.

Ink compositions prepared by dissolving water soluble acid dyes basic dyes or the like in water base media and further adding additives such as a humidifier, a pH controller and a preservative are known as conventional ink compositions for an ink jet recording apparatus.

However, these ink compositions have the defects that the printed parts are blurred to make the images indistinct, or because of the water solubility of the dyes, the recorded images are blurred or disappear due to sweat and water and that color mixing makes the colors turbid. Originally, water soluble dyes have the problem that they are inferior in light fastness and therefore storage of the printed matters over a long period of time deteriorates the images. Further, these ink compositions have the defect that storage thereof over a long period of time or repeated printing changes the physical properties of the inks or causes precipitates to clog nozzles or bring about marked troubles on discharge of the inks, which results in causing inferior printing.

SUMMARY OF THE INVENTION

A subject of the present invention is to solve the defects and problems described above.

An object of the present invention is to provide a colored resin fine particle dispersion liquid for a water base ink having such a sufficient color deepness as becoming a base material for a stable ink composition causing no precipitates.

Another object of the present invention is to provide a water base ink composition for a writing tool which provides clear written characters and drawn lines which neither are blurred nor disappear due to water and sweat and are so excellent in light fastness that they are not deteriorated over an extended period of time.

Further object of the present invention is to provide an ink composition for an ink jet recording apparatus which provides so clear images that the recorded images neither are blurred nor disappear due to water and sweat and the printed parts are not blurred and which is so excellent in light fastness that the images are not deteriorated even after storage of the printed matters over a long period of time and in which the color does not become turbid by color mixture.

According to one aspect of the present invention, provided is a colored resin fine particle water base dispersion liquid for a water base ink prepared by emulsion-polymerizing a vinyl monomer having an acid functional group in which a water soluble basic dye is dissolved in the presence of a polymerizable surfactant.

According to another aspect of the present invention, provided is a colored resin fine particle water base dispersion liquid for a water base ink prepared by dissolving a water soluble basic dye in a mixed vinyl monomer containing 5 to 90% by weight of a vinyl monomer comprising a carboxyl group as an acid functional group having a water solubility of 10% by weight or less and emulsion-polymerizing the above mixed vinyl monomer in the presence of a polymerizable surfactant.

According to further aspect of the present invention, provided is a colored resin fine particle water base dispersion liquid for a water base ink prepared by dissolving a water soluble basic dye in a mixed vinyl monomer comprising a vinyl monomer having an acid functional group and a vinyl monomer having at least one substituent selected from a cyano group, a triazine ring and a fluorine group and emulsion-polymerizing the above mixed vinyl monomer in the presence of a polymerizable surfactant.

According to an additional aspect of the present invention, provided is a colored resin fine particle water base dispersion liquid for a water base ink prepared by dissolving a water soluble basic dye in a mixed vinyl monomer comprising 5 to 90% by weight of a vinyl monomer containing a carboxyl group as an acid functional group having a water solubility of 10% by weight or less and a vinyl monomer having at least one substituent selected from a cyano group, a triazine ring and a fluorine group and emulsion-polymerizing the above mixed vinyl monomer in the presence of a polymerizable surfactant.

The colored resin fine particle water base dispersion liquid for a water base ink according to the present invention contains colored resin fine particles prepared by emulsion-polymerizing a vinyl monomer in which a water soluble basic dye is dissolved in advance. Accordingly, it shows a clear color and prevents the resin fine particles from coagulating or settling down over a long period of time.

According to further additional aspect of the present invention, provided is a water base ink composition which comprises: the colored resin fine particle water base dispersion liquid for a water base ink as described in any of the above items; a water soluble organic solvent; and water. Preferably, the above colored resin fine particle water base dispersion liquid for a water base ink has a content of 3 to 30% by weight (in terms of a resin solid-content); the above water soluble organic solvent has a content of 5 to 80 g by weight; and the above water has a content of 30 to 90% by weight each based on the whole amount of the ink composition.

According to more additional aspect of the present invention, provided is a water base ink composition for a writing tool which comprises: the colored resin fine particle water base dispersion liquid for a water base ink as described in any of the above items; a water soluble organic solvent; and water. Preferably, the above colored resin fine particle water base dispersion liquid for a water base ink has a content of 3 to 30% by weight (in terms of a resin solid content); the above water soluble organic solvent has a content of 5 to 80% by weight; and the above water has a content of 30 to 90% by weight each based on the whole amount of the ink composition.

The water base ink composition for a writing tool according to the present invention provides clear written characters or drawn lines which neither are blurred nor disappear due to water and sweat and in which the color does not become turbid by color mixture. Further, it is so excellent in waterproof and light fastness that the written characters or the drawn lines are not deteriorated even after leaving for standing over an extended period of time.

According to further more additional aspect of the present invention, provided is a water base ink composition for an ink jet recording apparatus which comprises: the colored resin fine particle water base dispersion liquid for a water base ink as described in any of the above items; a water soluble organic solvent ; and water. Preferably, the above colored resin fine particle water base dispersion liquid for a water base ink has a content of 3 to 30% by weight (in terms of a resin solid content); the above water soluble organic solvent has a content of 5 to 80% by weight; and the above water has a content of 30 to 90% by weight each based on the whole amount of the ink composition.

The water base ink composition for an ink jet recording apparatus according to the present invention has an excellent stability. Further, ink jet recording using this ink composition gives clear images without blurring at the printed parts and provides their excellent waterproof and light fastness.

Further advantages and features of the present invention as well as the scope, nature and utilization of the present invention shall become apparent to those skilled in the art from the description of the preferred embodiments of the present invention set forth below.

DESCRIPTION OF THE PREFERRED EMBODIMENTS

The colored resin fine particle water base dispersion liquid for a water base ink according to the present invention is prepared by emulsion-copolymerizing a mixed vinyl monomer containing a vinyl monomer having an acid group dissolving a water soluble basic dye using ammonium persulfate, potassium persulfate or hydrogen peroxide as a polymerization initiator, if necessary, in combination with a reducing agent in the presence of a polymerizable surfactant. The colored resin fine particle water base dispersion liquid for a water base ink thus prepared is usually obtained in the form of a concentrated solution having a resin solid content of 20 to 50% by weight.

The colored resin fine particle water base dispersion liquid for a water base ink obtained in the form of this concentrated solution is diluted with water and a water soluble organic solvent to adjust the resin solid content to 3 to 30% by weight, whereby the water base ink composition of the present invention is obtained.

The vinyl monomer having an acid functional group for use in preparing the colored resin fine particle water base dispersion liquid according to the present invention shall not specifically be restricted as long as it is a vinyl monomer having an acid functional group such as a carboxyl group and sulfone group and includes, for example, acrylic acid, methacrylic acid, 2-methacryloyloxyethyl succinate ("Acryl Ester SA" manufactured by Mitsubishi Rayon Co., Ltd.), 2-methacryloyloxyethyl phthalate ("Acryl Ester PA" manufactured by Mitsubishi Rayon Co., Ltd.), 2-methacryloyloxyethyl hexahydrophthalate ("Acryl Ester HH" manufactured by Mitsubishi Rayon Co., Ltd.), p-styrenesulfonic acid and 2-sulfoethyl methacrylate ("Acryl Ester SEM" manufactured by Mitsubishi Rayon Co., Ltd.).

A hydrophilic monomer alone such as a vinyl monomer having an acid functional group cannot be emulsion-polymerized in many cases, and the vinyl monomer mixed with a hydrophobic vinyl monomer is preferably emulsion-polymerized.

This hydrophobic vinyl monomer shall not specifically be restricted and includes, for example, acrylates such as methyl acrylate, ethyl acrylate, n-propyl acrylate and n-butyl acrylate, methacrylates such as methyl methacrylate, ethyl methacrylate, n-propyl methacrylate and n-butyl methacrylate, and styrenes such as styrene and methylstyrene. Further, in the above emulsion polymerization, monomers having a reactive cross-linking group such as an epoxy group, a hydroxymethylamide group and an isocyanate group and/or multifunctional monomers having two or more vinyl groups may be mixed for cross-linking.

The presence of the vinyl monomer having an acid functional group improves very much the admixture of the water soluble basic dye with the mixed vinyl monomer, and as a result thereof, the deeply colored resin fine particles can be obtained.

The blend amount of the vinyl monomer having an acid functional group in the emulsion polymerization is preferably 5 to 95% by weight based on the whole amount of the vinyl monomers. Too small amount thereof results in insufficiently admixing the water soluble basic dye with the vinyl monomer and insufficiently coloring the resin fine particles. On the other hand, too large amount thereof causes troubles on the emulsion polymerization.

Acrylonitrile and methacrylonitrile are the typical examples of the vinyl monomer having a cyano group for use in producing the colored resin fine particle water base dispersion liquid according to the present invention. Copolymerization with the vinyl monomer having a cyano group causes the resulting colored resin fine particles to show clearer color, which results in providing an ink for a writing tool and an ink for an ink jet recording with sufficient color deepness and clearness and making the light fastness more excellent.

The blend amount of the vinyl monomer having a cyano group in the emulsion polymerization is preferably 5 to 80% by weight based on the whole amount of the vinyl monomers. Too small amount thereof prevents the colored resin fine particles from improving in coloring property, concentration and light fastness. On the other hand, too large amount thereof causes troubles on the emulsion polymerization.

In the emulsion polymerization according to the present invention, other hydrophobic vinyl monomers in addition to the vinyl monomer having an acid functional group and the vinyl monomer having a cyano group may be mixed to obtain a mixed vinyl monomer to carry out the emulsion polymerization.

The hydrophobic vinyl monomer shall not specifically be restricted and includes, for example, acrylates such as methyl acrylate, ethyl acrylate, n-propyl acrylate and n-butyl acrylate, methacrylates such as methyl methacrylate, ethyl methacrylate, n-propyl methacrylate and n-butyl methacrylate, and styrenes such as styrene and methylstyrene.

Further, in the above emulsion polymerization, monomers having a reactive cross-linking group such as an epoxy group, a hydroxymethylamide group and an isocyanate group and/or multifunctional monomers having two or more vinyl groups may be blended for cross-linking.

Triallylcyanurate is a typical example of the triazine ring-containing vinyl monomer for use in preparing the colored resin fine particle water base dispersion liquid according to the present invention. Copolymerization with the triazine ring-containing vinyl monomer causes the resulting colored resin fine particles to show clearer color, which results in providing an ink for a writing tool and an ink for an ink jet recording with sufficient color deepness and clearness and making the light fastness more excellent.

The blend amount of the triazine ring-containing vinyl monomer in the emulsion polymerization is preferably 3 to 80% by weight based on the whole amount of the vinyl monomers. Too small amount thereof prevents the colored resin fine particles from improving in coloring property, concentration and light fastness. On the other hand, too large amount thereof causes troubles on the emulsion polymerization.

In the emulsion polymerization according to the present invention, other hydrophobic vinyl monomers in addition to the vinyl monomer having an acid functional group and the triazine ring-containing vinyl monomer may be mixed to obtain a mixed vinyl monomer to carry out the emulsion polymerization.

The hydrophobic vinyl monomer shall not specifically be restricted and includes, for example, acrylates such as methyl acrylate, ethyl acrylate, n-propyl acrylate and n-butyl acrylate, methacrylates such as methyl methacrylate, ethyl methacrylate, n-propyl methacrylate and n-butyl methacrylate, and styrenes such as styrene and methylstyrene.

Further, in the above emulsion polymerization, monomers having a reactive cross-linking group such as an epoxy group, a hydroxymethylamide group and an isocyanate group and/or multifunctional monomers having two or more vinyl groups may be blended for cross-linking.

The vinyl monomer having a fluorine group for use in producing the colored resin fine particle water base dispersion liquid according to the present invention shall not specifically be restricted and includes, for example, trifluoroethyl methacrylate ("Acryl Ester 3FE" manufactured by Mitsubishi Rayon Co., Ltd.) and heptadecafluorodecyl methacrylate ("Acryl Ester 17FE" manufactured by Mitsubishi Rayon Co., Ltd.).

Copolymerization with the vinyl monomer having a fluorine group causes the resulting colored resin fine particles to show clearer color, which results in providing an ink for a writing tool and an ink for an ink jet recording with sufficient color deepness and clearness and making the light fastness more excellent.

In the emulsion polymerization according to the present invention, other hydrophobic vinyl monomers in addition to the vinyl monomer having an acid functional group and the vinyl monomer having a fluorine group may be mixed to obtain a mixed vinyl monomer to carry out the emulsion polymerization.

The hydrophobic vinyl monomer shall not specifically be restricted and includes, for example, acrylates such as methyl acrylate, ethyl acrylate, n-propyl acrylate and n-butyl acrylate, methacrylates such as methyl methacrylate, ethyl methacrylate, n-propyl methacrylate and n-butyl methacrylate, and styrenes such as styrene and methylstyrene.

Further, in the above emulsion polymerization, monomers having a reactive cross-linking group such as an epoxy group, a hydroxymethylamide group and an isocyanate group and/or multifunctional monomers having two or more vinyl groups may be blended for cross-linking.

The blend amount of the vinyl monomer having a fluorine group is preferably 5 to 80% by weight based on the whole amount of the vinyl monomers. Too small blend amount thereof prevents the colored resin fine particles from improving in coloring property, concentration and light fastness.

Another colored resin fine particle water base dispersion liquid of the present invention is obtained in the form of a concentrated solution having a resin solid content of 20 to 50% by weight by dissolving a water soluble basic dye in a mixed vinyl monomer containing 5 to 90% by weight of a carboxyl group-containing vinyl monomer having a water solubility of 10% by weight or less and emulsion-polymerizing the mixed vinyl monomer using ammonium persulfate, potassium persulfate or hydrogen peroxide as a polymerization initiator, if necessary, in combination with a reducing agent in the presence of a polymerizable surfactant. The ink composition is obtained by diluting this concentrated solution with water and a water soluble organic solvent to adjust the resin solid content to 3 to 30% by weight.

The carboxyl group-containing vinyl monomer for use in preparing another colored resin fine particle water base dispersion liquid according to the present invention is a vinyl monomer having a water solubility of 10% by weight or less and includes, for example, 2-methacryloyoxyethyl succinate ("Acryl Ester SA", water solubility: 1.86% by weight, manufactured by Mitsubishi Rayon Co., Ltd.), 2-methacryloyloxyethyl maleate ("Acryl Ester ML", water solubility: 9.17% by weight, manufactured by Mitsubishi Rayon Co., Ltd.), 2-methacryloyloxy-ethyl phthalate ("Acryl Ester PA", water solubility: 0.08% by weight, manufactured by Mitsubishi Rayon Co., Ltd.), and 2-methacryloyloxyethyl hexahydrophthalate ("Acryl Ester HH", water solubility: 3.40% by weight, manufactured by Mitsubishi Rayon Co., Ltd.).

The use of the carboxyl group-containing vinyl monomer having a small water solubility can enhance the proportion of an acid monomer contained in the mixed vinyl monomer, and therefore a very large amount of the water soluble basic dye can be admixed with the vinyl monomer. As a result thereof, the deeply colored resin fine particles can be obtained. The blend amount of the carboxyl group-containing vinyl monomer is preferably 5 to 90% by weight based on the whole amount of the mixed vinyl monomer. Too small blend amount thereof results in decreasing the amount of the water soluble basic dye capable of being admixed with the vinyl monomer and therefore insufficiently coloring the resin fine particles. On the other hand, too large amount thereof causes troubles on the emulsion polymerization.

In the emulsion polymerization according to the present invention, other hydrophobic vinyl monomers in addition to the carboxyl group-containing vinyl monome may be mixed to obtain a mixed vinyl monomer to carry out the emulsion polymerization.

The hydrophobic vinyl monomer shall not specifically be restricted and includes, for example, acrylates such as methyl acrylate, ethyl acrylate, n-propyl acrylate and n-butyl acrylate, methacrylates such as methyl methacrylate, ethyl methacrylate, n-propyl methacrylate and n-butyl methacrylate, and styrenes such as styrene and methylstyrene.

Further, in the above emulsion polymerization, monomers having a reactive cross-linking group such as an epoxy group, a hydroxymethylamide group and an isocyanate group and multifunctional monomers having two or more vinyl groups may be mixed for cross-linking.

The water soluble basic dye for use in preparing the colored resin fine particle water base dispersion liquid according to the present invention shall not specifically be restricted and includes, for example, "AIZEN CATHILON YELLOW 7GLH" (CI BASIC YELLOW 21) manufactured by Hodogaya Chemical Ind. Co., Ltd., "BASACRYL GOLDEN YELLOW X-GFL" (CI BASIC YELLOW 28) manufactured by BASF Co., Ltd., "AIZEN CATHILON RED BLH 200%" (CI BASIC RED 39) manufactured by Hodogaya Chemical Ind. Co., "BASACRYL BRILLIANT RED G" (CI BASIC RED 52) manufactured by BASF Co., Ltd., "AIZEN CATHILON PURE BLUE 5GH 200%" (CI BASIC BLUE 3) manufactured by Hodogaya Chemical Ind. Co., and "BASACRYL BLUE X-3GL" (CI BASIC BLUE 41) manufactured by BASF Co., Ltd. The blend amount of the dye in the emulsion polymerization falls in a range of 0.2 to 50% by weight based on the whole amount of the monomers.

A surfactant is usually used in the emulsion polymerization according to the present invention. The surfactant shall not specifically be restricted and is preferably a polymerizable surfactant.

The polymerizable surfactant is an anionic or nonionic surfactant and includes, for example, Adekalia Soap NE-10, NE-20, NE-30, NE-40 and SE-10N which are polyoxyethylenealkylallylphenylethers or polyoxyethylenealkylallylphenylether surfuric acid ester salts represented by the following structural formula (A). In the formula, the variable n has the same values as the lower case letter "n" in the trade names of the compounds, e.g., Adekalia Soap NE-n or SE-n.

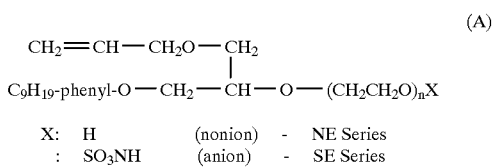

(A)

$$CH_2=CH-CH_2O-CH_2$$
$$C_9H_{19}\text{-phenyl-}O-CH_2-CH-O-(CH_2CH_2O)_nX$$

X: H      (nonion)  -  NE Series
:  SO$_3$NH  (anion)   -  SE Series where n represents the number of repeating ethylene oxide groups, where each manufactured by Asahi Denka Ind. Co., Ltd., Latemul S-180, S-180A and S-120A which are alkylallylsulfosuccinic acid salts, each manufactured by Kao Corporation, and Eleminol JS-2 which is a sulfate or sulfosucinate surfactant, manufactured by Sanyo Kasei Ind. Co., Ltd. They can be used alone or in combination of two or more kinds thereof. The use amount of the surfactant is preferably 0.1 to 50 g by weight based on the vinyl monomers.

The colored resin fine particle water base dispersion liquid according to the present invention contains little surface-active substance in a water base medium as compared with those obtained using conventional surfactants and therefore has a high surface tension (usually, 40 dyn/cm or more). Accordingly, the use thereof for an ink composition for an ink jet recording apparatus makes it possible to obtain the clear images without blurring at the printed parts. Further, it becomes possible to obtain a water-resistant film in which the images are not blurred or do not disappear due to water or sweat. In addition, when it is used as an ink for a writing tool, the written characters and the drawn lines neither are blurred nor disappear due to water or sweat, and the water-resistant drawn line film is obtained.

As described above, the ink composition of the present invention can be obtained by diluting the concentrated solution of the colored resin fine particle water base dispersion liquid with a water soluble organic solvent and water.

The water soluble organic solvent used for the ink composition of the present invention includes alkylene glycols such as ethylene glycol, triethylene glycol, tetraethylene glycol, dipropylene glycol, 1,2-propanediol, 1,3-propanediol, 1,2-butanediol, 2,3-butanediol, 1,3-butanediol, 1,4-butanediol, 1,2-pentanediol, 1,5-pentanediol, 2,5-hexanediol, 3-methyl-1,3-butanediol, 2-methylpentane-2,4-diol, 3-methylpentane-1,3,5-triol, 1,2,3-hexanetriol, and glycerin, polyalkylene glycols such as polyethylene glycol and polypropylene glycol, glycerols such as glycerol, diglycerol and triglycerol, lower alkyl ethers of glycols such as ethylene glycol monomethyl ether, ethylene glycol monoethyl ether, diethylene glycol monomethyl ether, diethylene glycol monoethyl ether and diethylene glycol mono-n-butyl ether, thiodiethanol, N-methyl-2-pyrrolidone, and 1,3-dimethyl-2-imidazolidinone.

The content thereof is preferably 5 to 80% by weight, more preferably 10 to 60% by weight based on the whole amount of the ink composition.

In addition thereto, there can be blended water soluble solvents including, for example, alcohols such as methyl alcohol, ethyl alcohol, isopropyl alcohol, n-butyl alcohol, tert-butyl alcohol, isobutyl alcohol, hexyl alcohol, octyl alcohol, nonyl alcohol, decyl alcohol and benzyl alcohol, amides such as dimethylformamide and diethylacetamide, ketones such as acetone, N-methylpyrrolidone, and 1,3-dimethyl-2-imidazolidinone.

The content of water is preferably 30 to 90% by weight, more preferably 40 to 60% by weight based on the whole amount of the ink composition.

In addition thereto, preservatives, pH controllers and defoaming agents can suitably be selected and used, if necessary.

The pH controllers include, for example, ammonia, urea, monoethanolamine, diethanolamine, triethanolamine, alkaline metal salts of carbonic acid and phosphoric acid such as sodium tripolyphosphate and sodium carbonate, and hydroxides of alkaline metals such as sodium hydroxide.

The preservatives or fungicides include phenol, sodium omadine, pentachlorophenol sodium, 1,2-benzoisothiazoline-3-one, 2,3,5,6-tetrachloro-4-(methylphenyl)pyridine, alkaline metal salts of benzoic acid, sorbic acid and dehydroacetic acid, and benzimidazole compounds.

The lubricants include polyalkylene glycol derivatives such as polyoxyethylene lauryl ether, fatty acid alkaline salts, nonionic surfactants, fluorinated surfactants such as perfluoroalkyl-phosphoric esters, and polyether-modified silicones such as polyethylene glycol adduct of dimethyl polysiloxane.

The colored resin fine particle water base dispersion liquid for an ink according to the present invention is not usually coagulated or precipitated. When this colored resin fine particle water base dispersion liquid for an ink is used for an ink composition for an ink jet recording apparatus, it does not cause clogging in passing through a fine nozzle because the colored resin fine particles for an ink have a particle diameter of 1.0 μm or less, and therefore the high-degree stability can be obtained. On the other hand, when this colored resin fine particle water base dispersion liquid for an ink is used for an ink composition for a writing tool, it does not cause clogging in passing through a fine pen point such as a felt pen.

Further, when the colored resin fine particle water base dispersion liquid for an ink according to the present invention is used for an ink composition for an ink jet recording apparatus, the color does not become turbid at the printed parts by color mixture, and therefore the clear images can be obtained. Further, the images neither are blurred nor disappear due to water and sweat. In addition, there can be provided the printed characters and the printed matters which are so excellent in light fastness that the images are not deteriorated even after storage over a long period of time. On the other hand, when the colored resin fine particle water base dispersion liquid for an ink according to the present invention is used for an ink composition for a writing tool, the written characters or drawn lines which neither are blurred nor disappear or do not have turbid color attributable to color mixing and which are clear and not blurred can be provided. Further, the written characters and drawn lines are so excellent in waterproof and light fastness that they are not deteriorated even after storage over an extended period of time.

EXAMPLES

The present invention shall be explained below in further detail with reference to examples and comparative examples. Performance tests in the respective examples were carried out according to the following methods.

Clearness:
The clearness of characters printed on a PPC copy paper was judged with naked eyes:
○: clear
Δ: slightly turbid
×: turbid Blur:
The degree of the blur of characters printed on a PPC copy paper was judged with naked eyes:
○: not blurred
Δ: slightly blurred
×: blurred Waterproof:
Characters printed on a PPC copy paper were dipped in water for one hour, and the degree of blur was judged with naked eyes:
○: not blurred
Δ: slightly blurred
×: blurred Light fastness:
Characters printed on a PPC copy paper were irradiated with a fade meter to determine time spent until fading was observed.

Storage stability:
A cartridge charged with the ink composition was put in a constant temperature bath of 50° C. to determine the number of days spent until printing was impossible.

Particle diameter:
The particle diameters of the colored resin fine particles contained in the ink composition were determined by means of a laser diffusion type particle size distribution-measuring meter (coulter counter, model N4SD manufactured by Nikkiso Co., Ltd.).

Viscosity:
The viscosity of the ink composition was measured by means of a corn plate type rotational viscometer (ELD type, manufactured by Tokyo Keiki Co., Ltd.). The measuring temperature was 25° C.

Surface tension:
The surface tension of the ink composition was determined by a suspending plate method. The measuring temperature was 25° C.

Example 1

A two liter flask equipped with a stirrer, a reflux condenser, a thermometer, a nitrogen gas-introducing tube and a 1000 ml separating funnel for charging a monomer was set in a hot water bath and charged with 500 g of distilled water, 50 g of a polymerizable surfactant ("Adekalia Soap SE-10N" manufactured by Asahi Denka Ind. Co., Ltd.) and 3 g of ammonium persulfate. Then, while introducing nitrogen gas, the inner temperature was elevated up to 50° C.

On the other hand, a solution was prepared by mixing 40 g of a water soluble basic dye ("AIZEN CATHILON RED BLH 200%" manufactured by Hodogaya Chemical Ind. Co., Ltd.) with 500 g of a mixed monomer comprising 200 g of methyl methacrylate, 100 g of triallylcyanurate and 200 g of 2-methacryloyloxyethyl succinate ("Acryl Ester SA" manufactured by Mitsubishi Rayon Co., Ltd.).

The solution thus prepared was added from the separating funnel described above to the flask maintained at temperatures of about 50° C. in 3 hours while stirring to carry out emulsion polymerization. Further, the solution was ripened for 5 hours to finish the polymerization, whereby a colored fine particle water base dispersion liquid was obtained.

Added to this colored fine particle water base dispersion liquid were 3000 g of distilled water and 1000 g of propylene glycol, and the dispersion liquid was stirred to homogeneity to thereby obtain a red ink composition having a viscosity of 2.8 cp and a surface tension of 50 dyn/cm.

The colored resin fine particles contained in the red ink composition had a particle diameter of 0.14 μm. The red ink composition had characteristics of excellent waterproof and light fastness and showed a clear red color without causing blur and clogging.

Example 2

A two liter flask equipped with a stirrer, a reflux condenser, a thermometer, a nitrogen gas-introducing tube and a 1000 ml separating funnel for charging a monomer was set in a hot water bath and charged with 500 g of distilled water, 40 g of a polymerizable surfactant ("Latemul S-180" manufactured by Kao Corporation) and 3 g of ammonium persulfate. Then, while introducing nitrogen gas, the inner temperature was elevated up to 50° C.

On the other hand, a solution was prepared by mixing 30 g of a water soluble basic dye ("AIZEN PURE BLUE 5GH 200%" manufactured by Hodogaya Chemical Ind. Co., Ltd.) with 500 g of a mixed monomer comprising 100 g of styrene, 200 g of methyl methacrylate, 100 g of triallylcyanurate and 100 g of methacrylic acid.

The solution thus prepared was added from the separating funnel described above to the flask maintained at temperatures of about 50° C. in 3 hours while stirring to carry out emulsion polymerization. Further, the solution was ripened for 5 hours to finish the polymerization, whereby a colored fine particle water base dispersion liquid was obtained.

Added to this colored fine particle water base dispersion liquid were 3000 g of distilled water and 1000 g of propylene glycol, and the dispersion liquid was stirred to homogeneity to thereby obtain a blue ink composition having a viscosity of 3.0 cp and a surface tension of 52 dyn/cm.

The colored resin fine particles contained in the blue ink composition had a particle diameter of 0.13 μm. The blue ink composition had characteristics of excellent waterproof and light fastness and showed a clear blue color without causing blur and clogging.

Comparative Example 1

A red ink composition was prepared in the same manner as in Example 1, except that 500 g of methyl methacrylate which was a single monomer was substituted for 500 g of the mixed monomer.

The ink composition thus obtained had a viscosity of 9.6 cp and a surface tension of 42 dyn/cm and was lacking in clearness. The colored resin fine particles contained in the ink composition had a particle diameter of 0.34 μm.

Comparative Example 2

A red ink composition was prepared in the same manner as in Example 1, except that 500 g of a mixed monomer comprising 300 g of methyl methacrylate and 200 g of triallylcyanurate was substituted for 500 g of the mixed monomer.

The ink composition thus obtained had a viscosity of 13.1 cp and a surface tension of 36 dyn/cm and was lacking in clearness. The red resin fine particles contained in the ink composition had a particle diameter of 0.56 μm.

Comparative Example 3

An uncolored resin fine particle water base dispersion liquid was prepared in the same manner as in Example 1, except that the water soluble basic dye was not used.

Then, 5 g of a water soluble basic dye ("AIZEN CATHILON PINK FGH" manufactured by Hodogaya Chemical Ind. Co., Ltd.), 1000 g of propylene glycol and 3000 g of distilled water were added to this water base dispersion liquid, and the solution was stirred to homogeneity to thereby obtain a red ink composition.

Comparative Example 4

A red ink composition was obtained by mixing 25 g of a water soluble acrylic resin ["JONCRYL 61J" (solid content: 30%) manufactured by Johnson Polymer Co., Ltd.], 2 g of the water soluble basic dye ("AIZEN CATHILON PINK FGH" manufactured by Hodogaya Chemical Ind. Co., Ltd.), 10 g of propylene glycol and 63 g of distilled water and stirring for one hour to dissolve them.

Comparative Example 5

A blue ink composition was obtained by mixing 1 g of a water soluble blue dye ("AIZEN VICTORIA PURE BLUE BOH" manufactured by Hodogaya Chemical Ind. Co., Ltd.), 10 g of propylene glycol and 89 g of distilled water and stirring for one hour to dissolve them.

The results obtained are shown in Table 1.

TABLE 1

|  | Example | | Comparative Example | | | | |
| --- | --- | --- | --- | --- | --- | --- | --- |
| No. | 1 | 2 | 1 | 2 | 3 | 4 | 5 |
| Clearness | ○ | ○ | x | x | x | Δ | x |
| Blur | ○ | ○ | Δ | Δ | Δ | Δ | x |
| Waterproof | ○ | ○ | x | x | x | Δ | x |
| Light fastness (hours) | 50≦ | 50≦ | 10≧ | 10≧ | 10≧ | 20 | 10≧ |
| Storage stability (days) | 180≦ | 180≦ | 45* | 45* | 45* | 180≦ | 180≦ |

*solidified

Example 3

A two liter flask equipped with a stirrer, a reflux condenser, a thermometer, a nitrogen gas-introducing tube and a 1000 ml separating funnel for charging a monomer was set in a hot water bath and charged with 250 g of distilled water. Then, while introducing nitrogen gas, the inner temperature was elevated up to 60° C.

On the other hand, a solution was prepared by mixing 40 g of the water soluble basic dye ("AIZEN CATHILON RED BLH 200%" manufactured by Hodogaya Chemical Ind. Co., Ltd.) with 500 g of a mixed monomer comprising 200 g of methyl methacrylate, 100 g of methacrylonitrile and 200 g of 2-methacryloyloxyethyl succinate ("Acryl Ester SA" manufactured by Mitsubishi Rayon Co., Ltd.), further mixing and dispersing 250 g of distilled water and 50 g of the polymerizable surfactant ("Adekalia Soap SE-10N" manufactured by Asahi Denka Ind. Co., Ltd.) while stirring and then dissolving 3 g of ammonium persulfate.

The solution thus prepared was added from the separating funnel described above to the flask maintained at temperatures of about 60° C. in 3 hours while stirring to finish the polymerization in 5 hours, whereby a colored fine particle water base dispersion liquid was obtained.

Added to this colored fine particle water base dispersion liquid were 3000 g of distilled water and 1000 g of propylene glycol, and the dispersion liquid was stirred to homogeneity to thereby obtain a red ink composition having a viscosity of 3.2 cp and a surface tension of 51 dyn/cm.

The colored resin fine particles contained in the red ink composition had a particle diameter of 0.16 μm. The red ink composition had characteristics of excellent waterproof and light fastness and showed a clear red color without causing blur and clogging.

Example 4

A two liter flask equipped with a stirrer, a reflux condenser, a thermometer, a nitrogen gas-introducing tube and a 1000 ml separating funnel for charging a monomer was set in a hot water bath and charged with 250 g of distilled water. Then, while introducing nitrogen gas, the inner temperature was elevated up to 50° C.

On the other hand, a solution was prepared by mixing 30 g of the water soluble basic dye ("AIZEN PURE BLUE 5GH 200%" manufactured by Hodogaya Chemical Ind. Co., Ltd.), 250 g of distilled water and 40 g of the polymerizable surfactant ("Latemul S-180" manufactured by Kao Corporation) with 500 g of a mixed monomer comprising 100 g of styrene, 200 g of methyl methacrylate, 100 g of methacrylonitrile and 100 g of methacrylic acid while stirring, and further dissolving 3 g of ammonium persulfate.

The solution thus prepared was added from the separating funnel described above to the flask maintained at temperatures of about 50° C. in 3 hours while stirring to finish the polymerization in 5 hours, whereby a colored fine particle water base dispersion liquid was obtained.

Added to this colored fine particle water base dispersion liquid were 3000 g of distilled water and 1000 g of propylene glycol, and the dispersion liquid was stirred to homogeneity to thereby obtain a blue ink composition having a viscosity of 3.0 cp and a surface tension of 50 dyn/cm.

The colored resin fine particles contained in the blue ink composition had a particle diameter of 0.14 μm. The blue ink composition had characteristics of excellent waterproof and light fastness and showed a clear blue color without causing blur and clogging.

Comparative Example 6

A red ink composition was prepared in the same manner as in Example 3, except that 500 g of a mixed monomer comprising 300 g of methyl methacrylate and 200 g of methacrylonitrile was substituted for 500 g of the mixed monomer.

The ink composition thus obtained had a viscosity of 10.5 cp and a surface tension of 37 dyn/cm and was lacking in clearness. The red resin fine particles contained in the ink composition had a particle diameter of 0.44 μm.

Comparative Example 7

An uncolored resin fine particle water base dispersion liquid was prepared in the same manner as in Example 3, except that the water soluble basic dye was not used.

Then, 5 g of the water soluble basic dye ("AIZEN CATHILON PINK FGH" manufactured by Hodogaya Chemical Ind. Co., Ltd.), 1000 g of propylene glycol and 3000 g of distilled water were added to this water base dispersion liquid, and the solution was stirred to homogeneity to thereby obtain a red ink composition.

The results obtained are shown in Table 2.

TABLE 2

| No. | Example 3 | Example 4 | Comparative Example 6 | Comparative Example 7 |
|---|---|---|---|---|
| Clearness | ○ | ○ | X | X |
| Blur | ○ | ○ | Δ | Δ |
| Waterproof | ○ | ○ | X | X |
| Light fastness (hours) | 50≦ | 50≦ | 10≧ | 10≧ |
| Storage stability (days) | 180≦ | 180≦ | 45* | 45* |

*solidified

Example 5

A two liter flask equipped with a stirrer, a reflux condenser, a thermometer, a nitrogen gas-introducing tube and a 1000 ml separating funnel for charging a monomer was set in a hot water bath and charged with 250 g of distilled water. Then, while introducing nitrogen gas, the inner temperature was elevated up to 60° C.

On the other hand, a solution was prepared by mixing 30 g of the water soluble basic dye ("AIZEN CATHILON RED BLH 200 A" manufactured by Hodogaya Chemical Ind. Co., Ltd.) with 500 g of a mixed monomer comprising 250 g of methyl methacrylate and 250 g of 2-methacryloyloxyethyl succinate ("Acryl Ester SA" manufactured by Mitsubishi Rayon Co., Ltd.), further mixing and dispersing 250 g of distilled water and 50 g of the polymerizable surfactant ("Adekalia Soap SE-10N" manufactured by Asahi Denka Ind. Co., Ltd.) while stirring and then dissolving 3 g of ammonium persulfate.

The solution thus prepared was added from the separating funnel described above to the flask maintained at temperatures of about 60° C. in 3 hours while stirring to finish the polymerization in 5 hours, whereby a colored fine particle water base dispersion liquid for an ink was obtained.

Added to this colored fine particle water base dispersion liquid for an ink were 3000 g of distilled water and 1000 g of propylene glycol, and the dispersion liquid was stirred to homogeneity to thereby obtain a red ink composition having a viscosity of 2.8 cp and a surface tension of 52 dyn/cm.

The colored resin fine particles contained in the red ink composition had a particle diameter of 0.12 μm. The red ink composition had characteristics of excellent waterproof and light fastness and showed a clear red color without causing blur and clogging.

Example 6

A two liter flask equipped with a stirrer, a reflux condenser, a thermometer, a nitrogen gas-introducing tube and a 1000 ml separating funnel for charging a monomer was set in a hot water bath and charged with 250 g of distilled water. Then, while introducing nitrogen gas, the inner temperature was elevated up to 50° C.

On the other hand, a solution was prepared by mixing 25 g of the water soluble basic dye ("AIZEN PURE BLUE 5GH 200%" manufactured by Hodogaya Chemical Ind. Co., Ltd.), 250 g of distilled water and 30 g of the polymerizable surfactant ("Latemul S-180" manufactured by Kao Corporation) with 500 g of a mixed monomer comprising 200 g of styrene, 200 g of methyl methacrylate and 100 g of methacrylic acid while stirring, and further dissolving 3 g of ammonium persulfate.

The solution thus prepared was added from the separating funnel described above to the flask maintained at temperatures of about 50° C. in 3 hours while stirring to finish the polymerization in 5 hours, whereby a colored fine particle water base dispersion liquid for an ink was obtained.

Added to this colored fine particle water base dispersion liquid for an ink were 3000 g of distilled water and 1000 g of propylene glycol, and the dispersion liquid was stirred to homogeneity to thereby obtain a blue ink composition having a viscosity of 3.2 cp and a surface tension of 49 dyn/cm.

The colored resin fine particles contained in the blue ink composition had a particle diameter of 0.15 μm. The blue ink composition had characteristics of excellent waterproof and light fastness and showed a clear blue color without causing blur and clogging.

Comparative Example 8

An uncolored resin fine particle water base dispersion liquid was obtained in the same manner as in Example 5, except that the water soluble basic dye was not used.

Then, 5 g of the water soluble basic dye ("AIZEN CATHILON PINK FGH" manufactured by Hodogaya Chemical Ind. Co., Ltd.), 3000 g of distilled water and 1000 g of propylene glycol were added to this water base dispersion liquid, and the dispersion liquid was stirred to homogeneity to thereby obtain a red ink composition.

The results obtained are shown in Table 3.

TABLE 3

| No. | Example 5 | Example 6 | Comparative Example 8 |
|---|---|---|---|
| Blur | ○ | ○ | Δ |
| Waterproof | ○ | ○ | X |
| Light fastness (hours) | 30 or more | 30 or more | 10 or less |
| Storage stability (days) | 180 or more | 180 or more | 45 (solidified) |

Example 7

A two liter flask equipped with a stirrer, a reflux condenser, a thermometer, a nitrogen gas-introducing tube and a 1000 ml separating funnel for charging a monomer was set in a hot water bath and charged with 250 g of distilled water. Then, while introducing nitrogen gas, the inner temperature was elevated up to 60° C.

On the other hand, a solution was prepared by mixing 30 g of the water soluble basic dye ("AIZEN CATHILON RED BLH 200%" manufactured by Hodogaya Chemical Ind. Co., Ltd.) with 500 g of a mixed monomer comprising 150 g of methyl methacrylate, 150 g of trifluoroethyl methacrylate ("Acryl Ester 3FE" manufactured by Mitsubishi Rayon Co., Ltd.) and 200 g of 2-methacryloyloxyethyl succinate ("Acryl Ester SA" manufactured by Mitsubishi Rayon Co., Ltd.), further mixing and dispersing 250 g of distilled water and 50 g of the polymerizable surfactant ("Adekalia Soap SE-10N" manufactured by Asahi Denka Ind. Co., Ltd.) while stirring and then dissolving 3 g of ammonium persulfate.

The solution thus prepared was added from the separating funnel described above to the flask maintained at temperatures of about 60° C. in 3 hours while stirring to finish the polymerization in 5 hours, whereby a colored fine particle water base dispersion liquid for an ink was obtained.

Added to this colored fine particle water base dispersion liquid for an ink were 3000 g of distilled water and 1000 g of propylene glycol, and the dispersion liquid was stirred to homogeneity to thereby obtain a red ink composition having a viscosity of 3.0 cp and a surface tension of 52 dyn/cm.

The colored resin fine particles contained in the red ink composition had a particle diameter of 0.14 μm. The red ink composition had characteristics of excellent waterproof and light fastness and showed a clear red color without causing blur and clogging.

Example 8

A two liter flask equipped with a stirrer, a reflux condenser, a thermometer, a nitrogen gas-introducing tube and a 1000 ml separating funnel for charging a monomer was set in a hot water bath and charged with 250 g of distilled water. Then, while introducing nitrogen gas, the inner temperature was elevated up to 50° C.

On the other hand, a solution was prepared by mixing 25 g of the water soluble basic dye ("AIZEN PURE BLUE 5GH 200%" manufactured by Hodogaya Chemical Ind. Co., Ltd.), 250 g of distilled water and 30 g of the polymerizable surfactant ("Latemul S-180" manufactured by Kao Corporation) with 500 g of a mixed monomer comprising 100 g of styrene, 200 g of methyl methacrylate, 100 g of heptadecafluorodecyl methacrylate and 100 g of methacrylic acid while stirring, and further dissolving 3 g of ammonium persulfate.

The solution thus prepared was added from the separating funnel described above to the flask maintained at temperatures of about 50° C. in 3 hours while stirring to finish the polymerization in 5 hours, whereby a colored fine particle water base dispersion liquid for an ink was obtained.

Added to this colored fine particle water base dispersion liquid for an ink were 3000 g of distilled water and 1000 g of propylene glycol, and the dispersion liquid was stirred to homogeneity to thereby obtain a blue ink composition having a viscosity of 2.9 cp and a surface tension of 50 dyn/cm.

The colored resin fine particles contained in the blue ink composition had a particle diameter of 0.13 μm. The blue ink composition had characteristics of excellent waterproof and light fastness and showed a clear blue color without causing blur and clogging.

Comparative Example 9

A red ink composition was prepared in the same manner as in Example 7, except that 300 g of methyl methacrylate and 200 g of trifluoroethyl methacrylate (Acryl Ester 3FE) were substituted for 500 g of the mixed monomer.

The ink composition thus obtained had a viscosity of 10.1 cp and a surface tension of 38 dyn/cm and was lacking in clearness. The red resin fine particles contained in the ink composition had a particle diameter of 0.40 μm.

Comparative Example 10

An uncolored resin fine particle water base dispersion liquid was prepared in the same manner as in Example 7, except that the water soluble basic dye was not used.

Then, 2 g of the water soluble basic dye ("AIZEN CATHILON PINK FGH" manufactured by Hodogaya Chemical Ind. Co., Ltd.), 1000 g of propylene glycol and 3000 g of distilled water were added to this water base dispersion liquid, and the dispersion liquid was stirred to homogeneity to thereby obtain a red ink composition.

The results obtained are shown in Table 4.

TABLE 4

|  | Example | | Comparative Example | |
| --- | --- | --- | --- | --- |
| No. | 7 | 8 | 9 | 10 |
| Clearness | ○ | ○ | X | X |
| Blur | ○ | ○ | Δ | Δ |
| Waterproof | ○ | ○ | X | X |
| Light fastness (hours) | 50≦ | 50≦ | 10≧ | 10≧ |
| Storage stability (days) | 180≦ | 180≦ | 45* | 45* |

*solidified

Example 9

A two liter flask equipped with a stirrer, a reflux condenser, a thermometer, a nitrogen gas-introducing tube and a 1000 ml separating funnel for charging a monomer was set in a hot water bath and charged with 500 g of distilled water, 50 g of the polymerizable surfactant (Adekalia Soap SE-10N manufactured by Asahi Denka Ind. Co., Ltd.) and 3 g of ammonium persulfate. Then, while introducing nitrogen gas, the inner temperature was elevated up to 80° C.

On the other hand, a solution was prepared by dissolving 40 g of the water soluble basic dye (AIZEN CATHILON RED BLH 200% manufactured by Hodogaya Chemical Ind. Co., Ltd.) in 500 g of a mixed monomer comprising 200 g of methyl methacrylate, 100 g of triallylcyanurate and 200 g of 2-methacryloyloxyethyl hexahydrophthalate (Acryl Ester HH having a water solubility of 3.40% by weight, manufactured by Mitsubishi Rayon Co., Ltd.).

The solution thus prepared was added from the separating funnel described above to the flask maintained at temperatures of about 80° C. in 3 hours while stirring. Further, the solution was ripened for 5 hours to finish the polymerization, whereby a colored fine particle water base dispersion liquid for an ink was obtained.

Added to this colored fine particle water base dispersion liquid for an ink were 3000 g of distilled water and 1000 g of propylene glycol, and the dispersion liquid was stirred to homogeneity to thereby obtain a red ink composition having a viscosity of 2.9 cp and a surface tension of 50 dyn/cm.

The colored resin fine particles contained in the red ink composition had a particle diameter of 0.13 μm. The red ink composition had characteristics of excellent waterproof and light fastness and showed a clear red color without causing blur and clogging.

Example 10

A two liter flask equipped with a stirrer, a reflux condenser, a thermometer, a nitrogen gas-introducing tube and a 1000 ml separating funnel for charging a monomer was set in a hot water bath and charged with 500 g of distilled water, 40 g of the polymerizable surfactant (Latemul S-180A manufactured by Kao Corporation) and 3 g of ammonium persulfate. Then, while introducing nitrogen gas, the inner temperature was elevated up to 60° C.

On the other hand, a solution was prepared by dissolving 50 g of the water soluble basic dye (AIZEN PURE BLUE 5GH 200 g manufactured by Hodogaya Chemical Ind. Co., Ltd.) in 500 g of a mixed monomer comprising 200 g of styrene, 100 g of triallylcyanurate and 200 g of 2-methacryloyloxyethyl phthalate (Acryl Ester PA having a water solubility of 0.08% by weight, manufactured by Mitsubishi Rayon Co., Ltd.).

The solution thus prepared was added from the separating funnel described above to the flask maintained at temperatures of about 60° C. in 3 hours while stirring. Further, the solution was ripened for 5 hours to finish the polymerization, whereby a colored fine particle water base dispersion liquid for an ink was obtained.

Added to this colored fine particle water base dispersion liquid for an ink were 3000 g of distilled water and 1000 g of propylene glycol, and the dispersion liquid was stirred to homogeneity to thereby obtain a blue ink composition having a viscosity of 3.0 cp and a surface tension of 52 dyn/cm.

The colored resin fine particles contained in the blue ink composition had a particle diameter of 0.12 μm. The red ink composition had characteristics of excellent waterproof and light fastness and showed a clear blue color without causing blur and clogging.

Comparative Example 11

An ink composition was prepared in the same manner as in Example 9, except that 200 g of methacrylic acid (water solubility=a) was substituted for 200 g of 2-methacryloyloxyethyl hexahydrophthalate. However, gelation was caused in the middle of preparing a colored fine particle water base dispersion liquid for an ink, and therefore the ink composition could not be obtained.

Comparative Example 12

An uncolored resin fine particle water base dispersion liquid was prepared in the same manner as in Example 9, except that the water soluble basic dye was not used.

Then, 10 g of the water soluble basic dye (AIZEN CATHILON PINK FGH manufactured by Hodogaya Chemical Ind. Co., Ltd.), 3000 g of distilled water and 1000 g of propylene glycol were added to this water base dispersion liquid, and the dispersion liquid was stirred to homogeneity to thereby obtain a red ink composition.

The results obtained are shown in Table 5.

TABLE 5

| | Example | | Comparative Example | |
|---|---|---|---|---|
| No. | 9 | 10 | 11 | 12 |
| Clearness | ○ | ○ | — | X |
| Blur | ○ | ○ | — | Δ |
| Waterproof | ○ | ○ | — | X |

TABLE 5-continued

| | Example | | Comparative Example | |
|---|---|---|---|---|
| No. | 9 | 10 | 11 | 12 |
| Light fastness (hours) | 50 or more | 50 or more | — | 10 or less |
| Storage stability (days) | 180 or more | 180 or more | — | 45* |

*solidified

Measurements in the examples and comparative examples shown below were carried out according to the following methods. Particle diameters, viscosities and surface tensions were determined by the same methods as described previously.

Clearness:
The sharpness of characters written on a writing paper was judged with naked eyes:
○: clear
Δ: slightly turbid
×: turbid Blur:
The degree of the blur of characters written on a writing paper was judged with naked eyes:
○: not blurred
Δ: slightly blurred
×: blurred Waterproof:
Characters written on a writing paper were dipped in water for one hour, and the degree of blur was judged with naked eyes:
○: not blurred
Δ: slightly blurred
×: blurred Light fastness:
Characters written on a writing paper were irradiated with a fade meter to determine time spent until fading was observed.

Storage stability:
A water base sign pen charged with the ink composition was put in a constant temperature bath of 50° C. to determine the number of days spent until writing was impossible.

Example 11

A two liter flask equipped with a stirrer, a reflux condenser, a thermometer, a nitrogen gas-introducing tube and a 1000 ml separating funnel for charging a monomer was set in a hot water bath and charged with 500 g of distilled water, 50 g of the polymerizable surfactant ("Adekalia Soap SE-10N" manufactured by Asahi Denka Ind. Co., Ltd.) and 3 g of ammonium persulfate. Then, while introducing nitrogen gas, the inner temperature was elevated up to 50° C.

On the other hand, a solution was prepared by mixing 40 g of the water soluble basic dye ("AIZEN CATHILON RED BLH 200%" manufactured by Hodogaya Chemical Ind. Co., Ltd.) with 500 g of a mixed monomer comprising 200 g of methyl methacrylate, 100 g of triallylcyanurate and 200 g of 2-methacryloyloxyethyl succinate ("Acryl Ester SA" manufactured by Mitsubishi Rayon Co., Ltd.).

The solution thus prepared was added from the separating funnel described above to the flask maintained at temperatures of about 50° C. in 3 hours while stirring to carry out emulsion polymerization. Further, the solution was ripened for 5 hours to finish the polymerization, whereby a colored fine particle water base dispersion liquid was obtained.

Added to this colored fine particle water base dispersion liquid were 3000 g of distilled water and 1000 g of propylene glycol, and the dispersion liquid was stirred to homogeneity to thereby obtain a red ink composition having a viscosity of 2.8 cp and a surface tension of 50 dyn/cm.

The colored resin fine particles contained in the red ink composition had a particle diameter of 0.14 μm. The red ink composition had characteristics of excellent waterproof and light fastness and showed a clear red color without causing blur and clogging.

Example 12

A two liter flask equipped with a stirrer, a reflux condenser, a thermometer, a nitrogen gas-introducing tube and a 1000 ml separating funnel for charging a monomer was set in a hot water bath and charged with 500 g of distilled water, 40 g of the polymerizable surfactant ("Latemul S-180" manufactured by Kao Corporation) and 3 g of ammonium persulfate. Then, while introducing nitrogen gas, the inner temperature was elevated up to 50° C.

On the other hand, a solution was prepared by mixing 30 g of the water soluble basic dye ("AIZEN PURE BLUE 5GH 200%" manufactured by Hodogaya Chemical Ind. Co., Ltd.) with 500 g of a mixed monomer comprising 100 g of styrene, 200 g of methyl methacrylate, 100 g of triallylcyanurate and 100 g of methacrylic acid.

The solution thus prepared was added from the separating funnel described above to the flask maintained at temperatures of about 50° C. in 3 hours while stirring to carry out emulsion polymerization. Further, the solution was ripened for 5 hours to finish the polymerization, whereby a colored fine particle water base dispersion liquid was obtained.

Added to this colored fine particle water base dispersion liquid were 3000 g of distilled water and 1000 g of propylene glycol, and the dispersion liquid was stirred to homogeneity to thereby obtain a blue ink composition having a viscosity of 3.0 cp and a surface tension of 52 dyn/cm.

The colored resin fine particles contained in the blue ink composition had a particle diameter of 0.13 μm. The blue ink composition had characteristics of excellent waterproof and light fastness and showed a clear blue color without causing blur and clogging.

Comparative Example 13

A red ink composition was prepared in the same manner as in Example 11, except that 500 g of methyl methacrylate which was a single monomer was substituted for 500 g of the mixed monomer.

The ink composition thus obtained had a viscosity of 9.6 cp and a surface tension of 42 dyn/cm and was lacking in clearness. The colored resin fine particles contained in the ink composition had a particle diameter of 0.34 μm.

Comparative Example 14

A red ink composition was prepared in the same manner as in Example 11, except that 500 g of a mixed monomer comprising 300 g of methyl methacrylate and 200 g of triallylcyanurate was substituted for 500 g of the mixed monomer.

The ink composition thus obtained had a viscosity of 13.1 cp and a surface tension of 36 dyn/cm and was lacking in clearness. The red resin fine particles contained in the ink composition had a particle diameter of 0.56 μm.

Comparative Example 15

An uncolored resin fine particle water base dispersion liquid was prepared in the same manner as in Example 11, except that the water soluble basic dye was not used.

Then, 5 g of the water soluble basic dye ("AIZEN CATHILON PINK FGH" manufactured by Hodogaya Chemical Ind. Co., Ltd.), 1000 g of propylene glycol and 3000 g of distilled water were added to this water base dispersion liquid, and the dispersion liquid was stirred to homogeneity to thereby obtain a red ink composition.

Comparative Example 16

A red ink composition was obtained by mixing 25 g of the water soluble acrylic resin ["JONCRYL 61J" (solid content: 30%) manufactured by Johnson Polymer Co., Ltd.], 2 g of the water soluble basic dye ("AIZEN CATHILON PINK FGH" manufactured by Hodogaya Chemical Ind. Co., Ltd.), 10 g of propylene glycol and 63 g of distilled water and stirring for one hour to dissolve them.

Comparative Example 17

A blue ink composition was obtained by mixing 1 g of the water soluble blue dye ("AIZEN VICTORIA PURE BLUE BOH" manufactured by Hodogaya Chemical Ind. Co., Ltd.), 10 g of propylene glycol and 89 g of distilled water and stirring for one hour to dissolve them.

The results obtained are shown in Table 6.

TABLE 6

| No. | Example | | Comparative Example | | | | |
|---|---|---|---|---|---|---|---|
| | 11 | 12 | 13 | 14 | 15 | 16 | 17 |
| Clearness | ○ | ○ | x | x | x | Δ | x |
| Blur | ○ | ○ | Δ | Δ | Δ | Δ | x |
| Waterproof | ○ | ○ | x | x | x | Δ | x |
| Light fastness (hours) | 50≦ | 50≦ | 10≧ | 10≧ | 10≧ | 20 | 10≧ |
| Storage stability (days) | 180≦ | 180≦ | 45** | 45** | 45** | 180≦ | 180≦ |

**unwritable

Example 13

A two liter flask equipped with a stirrer, a reflux condenser, a thermometer, a nitrogen gas-introducing tube and a 1000 ml separating funnel for charging a monomer was set in a hot water bath and charged with 500 g of distilled water, 50 g of a polymerizable surfactant ("Adekalia Soap SE-10N" manufactured by Asahi Denka Ind. Co., Ltd.) and 3 g of ammonium persulfate. Then, while introducing nitrogen gas, the inner temperature was elevated up to 50° C.

On the other hand, a solution was prepared by mixing 40 g of the water soluble basic dye ("AIZEN CATHILON RED BLH 200 i" manufactured by Hodogaya Chemical Ind. Co., Ltd.) with 500 g of a mixed monomer comprising 200 g of methyl methacrylate, 100 g of methacrylonitrile and 200 g of 2-methacryloyloxyethyl succinate ("Acryl Ester SA" manufactured by Mitsubishi Rayon Co., Ltd.).

The solution thus prepared was added from the separating funnel described above to the flask maintained at temperatures of about 50° C. in 3 hours while stirring to finish the polymerization in 5 hours, whereby a colored fine particle water base dispersion liquid was obtained.

Added to this colored fine particle water base dispersion liquid were 3000 g of distilled water and 1000 g of propylene glycol, and the dispersion liquid was stirred to homogeneity to thereby obtain a red ink composition having a viscosity of 3.0 cp and a surface tension of 50 dyn/cm.

The colored resin fine particles contained in the red ink composition had a particle diameter of 0.14 μm. The red ink composition had characteristics of excellent waterproof and light fastness and showed a clear red color without causing blur and clogging.

Example 14

A two liter flask equipped with a stirrer, a reflux condenser, a thermometer, a nitrogen gas-introducing tube and a 1000 ml separating funnel for charging a monomer was set in a hot water bath and charged with 500 g of distilled water, 40 g of the polymerizable surfactant ("Latemul S-180" manufactured by Kao Corporation) and 3 g of ammonium persulfate. Then, while introducing nitrogen gas, the inner temperature was elevated up to 50° C.

On the other hand, a solution was prepared by mixing 30 g of the water soluble basic dye ("AIZEN PURE BLUE 5GH 200 A" manufactured by Hodogaya Chemical Ind. Co., Ltd.) with 500 g of a mixed monomer comprising 100 g of styrene, 200 g of methyl methacrylate, 100 g of methacrylonitrile and 100 g of methacrylic acid.

The solution thus prepared was added from the separating funnel described above to the flask maintained at temperatures of about 50° C. in 3 hours while stirring to finish the polymerization in 5 hours, whereby a colored fine particle water base dispersion liquid was obtained.

Added to this colored fine particle water base dispersion liquid were 3000 g of distilled water and 1000 g of propylene glycol, and the dispersion liquid was stirred to homogeneity to thereby obtain a blue ink composition having a viscosity of 2.8 cp and a surface tension of 52 dyn/cm.

The colored resin fine particles contained in the blue ink composition had a particle diameter of 0.13 μm. The blue ink composition had characteristics of excellent waterproof and light fastness and showed a clear blue color without causing blur and clogging.

Comparative Example 18

A red ink composition was prepared in the same manner as in Example 13, except that 500 g of a mixed monomer comprising 300 g of methyl methacrylate and 200 g of methacrylonitrile was substituted for 500 g of the mixed monomer.

The ink composition thus obtained had a viscosity of 9.1 cp and a surface tension of 38 dyn/cm and was lacking in clearness. The red resin fine particles contained in the ink composition had a particle diameter of 0.45 μm.

Comparative Example 19

An uncolored resin fine particle water base dispersion liquid was obtained in the same manner as in Example 13, except that the water soluble basic dye was not used.

Then, 5 g of the water soluble basic dye ("AIZEN CATHILON PINK FGH" manufactured by Hodogaya Chemical Ind. Co., Ltd.), 1000 g of propylene glycol and 3000 g of distilled water were added to this water base dispersion liquid, and the dispersion liquid was stirred to homogeneity to thereby obtain a red ink composition.

The results obtained are shown in Table 7.

TABLE 7

| No. | Example | | Comparative Example | |
|---|---|---|---|---|
| | 13 | 14 | 18 | 19 |
| Clearness | ○ | ○ | X | X |
| Blur | ○ | ○ | Δ | Δ |
| Waterproof | ○ | ○ | X | X |
| Light fastness (hours) | 50≧ | 50≧ | 10≧ | 10≧ |
| Storage stability (days) | 180≧ | 180≧ | 45** | 45** |

**unwritable

Example 15

A two liter flask equipped with a stirrer, a reflux condenser, a thermometer, a nitrogen gas-introducing tube and a 1000 ml separating funnel for charging a monomer was set in a hot water bath and charged with 500 g of distilled water, 50 g of a polymerizable surfactant ("Adekalia Soap SE-10N" manufactured by Asahi Denka Ind. Co., Ltd.) and 3 g of ammonium persulfate. Then, while introducing nitrogen gas, the inner temperature was elevated up to 50° C.

On the other hand, a solution was prepared by mixing 40 g of the water soluble basic dye ("AIZEN CATHILON RED BLH 200%" manufactured by Hodogaya Chemical Ind. Co., Ltd.) with 500 g of a mixed monomer comprising 250 g of methyl methacrylate and 250 g of 2-methacryloyloxyethyl succinate ("Acryl Ester SA" manufactured by Mitsubishi Rayon Co., Ltd.).

The solution thus prepared was added from the separating funnel described above to the flask maintained at temperatures of about 50° C. in 3 hours while stirring to finish the polymerization in 5 hours, whereby a colored resin fine particle water base dispersion liquid was obtained.

Added to this resin fine particle water base dispersion liquid were 3000 g of distilled water and 1000 g of propylene glycol, and the dispersion liquid was stirred to homogeneity to thereby obtain a red ink composition for a writing tool having a viscosity of 2.9 cp and a surface tension of 52 dyn/cm.

The colored resin fine particles contained in this red ink composition had a particle diameter of 0.13 μm. The red ink composition had characteristics of excellent waterproof and light fastness and showed a clear red color without causing blur and clogging.

Example 16

A two liter flask equipped with a stirrer, a reflux condenser, a thermometer, a nitrogen gas-introducing tube and a 1000 ml separating funnel for charging a monomer was set in a hot water bath and charged with 500 g of distilled water, 40 g of the polymerizable surfactant ("Latemul S-180" manufactured by Kao Corporation) and 3 g of ammonium persulfate. Then, while introducing nitrogen gas, the inner temperature was elevated up to 50° C.

On the other hand, a solution was prepared by mixing 30 g of the water soluble basic dye ("AIZEN PURE BLUE 5GH 200 i" manufactured by Hodogaya Chemical Ind. Co., Ltd.) with 500 g of a mixed monomer comprising 200 g of styrene, 200 g of methyl methacrylate and 100 g of methacrylic acid.

The solution thus prepared was added from the separating funnel described above to the flask maintained at temperatures of about 50° C. in 3 hours while stirring to finish the polymerization in 5 hours, whereby a colored resin fine particle water base dispersion liquid was obtained.

Added to this resin fine particle water base dispersion liquid were 3000 g of distilled water and 1000 g of propylene glycol, and the dispersion liquid was stirred to homogeneity to thereby obtain a blue ink composition for a writing tool having a viscosity of 3.0 cp and a surface tension of 50 dyn/cm.

The colored resin fine particles contained in this blue ink composition had a particle diameter of 0.14 μm. The blue ink composition had characteristics of excellent waterproof and light fastness and showed a clear blue color without causing blur and clogging.

Comparative Example 20

An uncolored resin fine particle water base dispersion liquid was prepared in the same manner as in Example 15, except that the water soluble basic dye was not used.

Then, 5 g of the water soluble basic dye ("AIZEN CATHILON PINK FGH" manufactured by Hodogaya Chemical Ind. Co., Ltd.) was mixed with this water base dispersion liquid. Further, 3000 g of distilled water and 1000 g of propylene glycol were added, and the solution was stirred to homogeneity to thereby obtain a red ink composition.

The results obtained are shown in Table 8.

TABLE 8

| No. | Example 15 | Example 16 | Comparative Example 20 |
|---|---|---|---|
| Blur | ○ | ○ | Δ |
| Waterproof | ○ | ○ | X |
| Light fastness (hours) | 30 or more | 30 or more | 10 or less |
| Storage stability (days) | 180 or more | 180 or more | 45** |

**unwritable

Example 17

A two liter flask equipped with a stirrer, a reflux condenser, a thermometer, a nitrogen gas-introducing tube and a 1000 ml separating funnel for charging a monomer was set in a hot water bath and charged with 500 g of distilled water, 50 g of a polymerizable surfactant ("Adekalia Soap SE-10N" manufactured by Asahi Denka Ind. Co., Ltd.) and 3 g of ammonium persulfate. Then, while introducing nitrogen gas, the inner temperature was elevated up to 50° C.

On the other hand, a solution was prepared by mixing 40 g of the water soluble basic dye ("AIZEN CATHILON RED BLH 200 A" manufactured by Hodogaya Chemical Ind. Co., Ltd.) with 500 g of a mixed monomer comprising 150 g of methyl methacrylate, 150 g of trifluoroethyl methacrylate ("Acryl Ester 3FE" manufactured by Mitsubishi Rayon Co., Ltd.) and 200 g of 2-methacryloyloxyethyl succinate ("Acryl Ester SA" manufactured by Mitsubishi Rayon Co., Ltd.).

The solution thus prepared was added from the separating funnel described above to the flask maintained at temperatures of about 50° C. in 3 hours while stirring to finish the polymerization in 5 hours, whereby a colored resin fine particle water base dispersion liquid was obtained.

Added to this resin fine particle water base dispersion liquid were 3000 g of distilled water and 1000 g of propylene glycol, and the dispersion liquid was stirred to homogeneity to thereby obtain a red ink composition for a writing tool having a viscosity of 2.9 cp and a surface tension of 52 dyn/cm.

The colored resin fine particles contained in this red ink composition had a particle diameter of 0.13 μm. The red ink composition had characteristics of excellent waterproof and light fastness and showed a clear red color without causing blur and clogging.

Example 18

A two liter flask equipped with a stirrer, a reflux condenser, a thermometer, a nitrogen gas-introducing tube and a 1000 ml separating funnel for charging a monomer was set in a hot water bath and charged with 500 g of distilled water, 40 g of the polymerizable surfactant ("Latemul S-180" manufactured by Kao Corporation) and 3 g of ammonium persulfate. Then, while introducing nitrogen gas, the inner temperature was elevated up to 50° C. On the other hand, a solution was prepared by mixing 30 g of the water soluble basic dye ("AIZEN PURE BLUE 5GH 200%" manufactured by Hodogaya Chemical Ind. Co., Ltd.) with 500 g of a mixed monomer comprising 100 g of styrene, 200 g of methyl methacrylate, 100 g of heptadecafluorodecyl methacrylate and 100 g of methacrylic acid.

The solution thus prepared was added from the separating funnel described above to the flask maintained at temperatures of about 50° C. in 3 hours while stirring to finish the polymerization in 5 hours, whereby a colored resin fine particle water base dispersion liquid was obtained.

Added to this resin fine particle water base dispersion liquid were 3000 g of distilled water and 1000 g of propylene glycol, and the dispersion liquid was stirred to homogeneity to thereby obtain a blue ink composition for a writing tool having a viscosity of 3.0 cp and a surface tension of 50 dyn/cm.

The colored resin fine particles contained in this blue ink composition had a particle diameter of 0.12 μm.

The blue ink composition had characteristics of excellent waterproof and light fastness and showed a clear blue color without causing blur and clogging.

Comparative Example 21

A red ink composition was prepared in the same manner as in Example 17, except that 300 g of methyl methacrylate and 200 g of trifluoroethyl methacrylate (Acryl Ester 3FE) were substituted for 500 g of the mixed monomer.

The ink composition thus obtained had a viscosity of 10.1 cp and a surface tension of 38 dyn/cm and was lacking in clearness. The red resin fine particles contained in the ink composition had a particle diameter of 0.40 μm.

Comparative Example 22

An uncolored resin fine particle water base dispersion liquid was prepared in the same manner as in Example 17, except that the water soluble basic dye was not used.

Then, 5 g of the water soluble basic dye ("AIZEN CATHILON PINK FGH" manufactured by Hodogaya Chemical Ind. Co., Ltd.), 3000 g of distilled water and 1000 g of propylene glycol were added to this water base dispersion liquid, and the solution was stirred to homogeneity to thereby obtain a red ink composition.

The results obtained are shown in Table 9.

TABLE 9

|  | Example | | Comparative Example | |
|---|---|---|---|---|
| No. | 17 | 18 | 21 | 22 |
| Clearness | ○ | ○ | X | X |
| Blur | ○ | ○ | Δ | Δ |
| Waterproof | ○ | ○ | X | X |
| Light fastness (hours) | 50≦ | 50≦ | 10≧ | 10≧ |
| Storage stability (days) | 180≦ | 180≦ | 45** | 45** |

**unwritable

Example 19

A two liter flask equipped with a stirrer, a reflux condenser, a thermometer, a nitrogen gas-introducing tube and a 1000 ml separating funnel for charging a monomer was set in a hot water bath and charged with 500 g of distilled water, 50 g of the polymerizable surfactant (Adekalia Soap SE-10N manufactured by Asahi Denka Ind. Co., Ltd.) and 3 g of ammonium persulfate. Then, while introducing nitrogen gas, the inner temperature was elevated up to 80° C.

On the other hand, a solution was prepared by dissolving 40 g of the water soluble basic dye (AIZEN CATHILON RED BLH 200% manufactured by Hodogaya Chemical Ind. Co., Ltd.) in 500 g of a mixed monomer comprising 200 g of methyl methacrylate, 100 g of triallylcyanurate and 200 g of 2-methacryloyloxyethyl hexahydrophthalate (Acryl Ester SA having a water solubility of 1.86% by weight, manufactured by Mitsubishi Rayon Co., Ltd.).

The solution thus prepared was added from the separating funnel described above to the flask maintained at temperatures of about 80° C. in 3 hours while stirring. Further, the solution was ripened for 5 hours to finish the polymerization, whereby a colored fine particle water base dispersion liquid for an ink was obtained.

Added to this colored fine particle water base dispersion liquid for an ink were 3000 g of distilled water and 1000 g of propylene glycol, and the dispersion liquid was stirred to homogeneity to thereby obtain a red ink composition having a viscosity of 2.9 cp and a surface tension of 50 dyn/cm.

The colored resin fine particles contained in the red ink composition had a particle diameter of 0.13 μm. The red ink composition had characteristics of excellent waterproof and light fastness and showed a clear red color without causing blur and clogging.

Example 20

A two liter flask equipped with a stirrer, a reflux condenser, a thermometer, a nitrogen gas-introducing tube and a 1000 ml separating funnel for charging a monomer was set in a hot water bath and charged with 500 g of distilled water, 40 g of the polymerizable surfactant (Latemul S-180A manufactured by Kao Corporation) and 3 g of ammonium persulfate. Then, while introducing nitrogen gas, the inner temperature was elevated up to 60° C.

On the other hand, a solution was prepared by dissolving 50 g of the water soluble basic dye (AIZEN PURE BLUE 5GH 200% manufactured by Hodogaya Chemical Ind. Co., Ltd.) in 500 g of a mixed monomer comprising 200 g of styrene, 100 g of triallylcyanurate and 200 g of 2-methacryloyloxyethyl phthalate (Acryl Ester PA having a water solubility of 0.08% by weight, manufactured by Mitsubishi Rayon Co., Ltd.).

The solution thus prepared was added from the separating funnel described above to the flask maintained at temperatures of about 60° C. in 3 hours while stirring. Further, the solution was ripened for 5 hours to finish the polymerization, whereby a colored fine particle water base dispersion liquid for an ink was obtained. Added to this colored fine particle water base dispersion liquid for an ink were 3000 g of distilled water and 1000 g of propylene glycol, and the dispersion liquid was stirred to homogeneity to thereby obtain a blue ink composition having a viscosity of 3.0 cp and a surface tension of 52 dyn/cm.

The colored resin fine particles contained in the blue ink composition had a particle diameter of 0.12 μm. The blue ink composition had characteristics of excellent waterproof and light fastness and showed a clear blue color without causing blur and clogging.

Comparative Example 23

An ink composition was prepared in the same manner as in Example 19, except that 200 g of methacrylic acid (water solubility=a) was substituted for 200 g of 2-methacryloyloxyethyl hexahydrophthalate. However, gelation was caused in the middle of preparing a colored fine particle water base dispersion liquid for an ink, and therefore the ink composition could not be obtained.

Comparative Example 24

An uncolored resin fine particle water base dispersion liquid was prepared in the same manner as in Example 19, except that the water soluble basic dye was not used.

Then, 10 g of the water soluble basic dye (AIZEN CATHILON PINK FGH manufactured by Hodogaya Chemical Ind. Co., Ltd.), 3000 g of distilled water and 1000 g of propylene glycol were added to this water base dispersion liquid, and the dispersion liquid was stirred to homogeneity to thereby obtain a red ink composition. The results obtained are shown in Table 10.

TABLE 10

|  | Example | | Comparative Example | |
|---|---|---|---|---|
| No. | 19 | 20 | 23 | 24 |
| Clearness | ○ | ○ | — | X |
| Blur | ○ | ○ | — | Δ |
| Waterproof | ○ | ○ | — | X |
| Light fastness (hours) | 50≦ | 50≦ | — | 10≧ |
| Storage stability (days) | 180≦ | 180≦ | — | 45** |

**unwritable

What is claimed is:

1. A colored resin fine particle water base dispersion liquid for a water base ink prepared by emulsion—polymerizing a vinyl monomer having an acid functional group in which a water soluble basic dye is dissolved in the presence of a polymerizable surfactant represented by the formula (A),

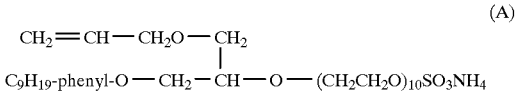

wherein said surfactant is capable of reacting with the double bond of a vinyl monomer.

2. A colored resin fine particle water base dispersion liquid for a water base ink prepared by dissolving a water soluble basic dye in a mixed vinyl monomer comprising 5 to 90% by weight of a vinyl monomer containing a carboxyl group as an acid functional group having a water solubility of 10% by weight or less and emulsion-polymerizing said mixed vinyl monomer in the presence of a polymerizable surfactant represented by the formula (A),

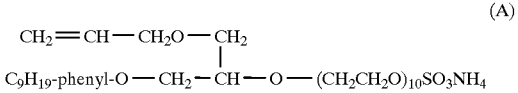

wherein said surfactant is capable of reacting with the double bond of a vinyl monomer.

3. A colored resin fine particle water base dispersion liquid for a water base ink prepared by dissolving a water soluble basic dye in a mixed vinyl monomer comprising a vinyl monomer having an acid functional group and a vinyl monomer having at least one substituent selected from a cyano group, a triazine ring and a fluorine group and emulsion-polymerizing said mixed vinyl monomer in the presence of a polymerizable surfactant represented by the formula (A),

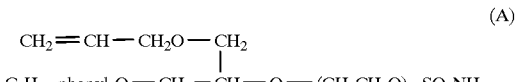

wherein said surfactant is capable of reacting with the double bond of a vinyl monomer.

4. A colored resin fine particle water base dispersion liquid for a water base ink prepared by dissolving a water soluble basic dye in a mixed vinyl monomer comprising 5 to 90% by weight of a vinyl monomer containing a carboxyl group as an acid functional group having a water solubility of 10% by weight or less and a vinyl monomer having at least one substituent selected from a cyano group, a triazine ring and a fluorine group and emulsion-polymerizing said mixed vinyl monomer in the presence of a polymerizable surfactant represented by the formula (A),

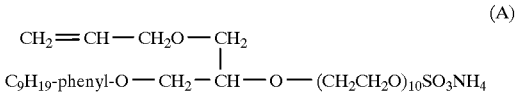

wherein said surfactant is capable of reacting with the double bond of a vinyl monomer.

5. A water base ink composition, comprising: the colored resin fine particle water base dispersion liquid for a water base ink of claim 1; a water soluble organic solvent; and water.

6. The water base ink composition as described in claim 5, wherein said colored resin fine particle water base dispersion liquid for a water base ink has a content of 3 to 30% by weight of resin solids; said water soluble organic solvent has a content of 5 to 80% by weight; and said water has a content of 30 to 90% by weight each based on the whole amount of the ink composition.

7. A water base ink composition, comprising: the colored resin fine particle water base dispersion liquid for a water base ink of claim 2; a water soluble organic solvent; and water.

8. The water base ink composition as described in claim 7, wherein said colored resin fine particle water base dispersion liquid for a water base ink has a content of 3 to 30% by weight of resin solids; said water soluble organic solvent has a content of 5 to 80% by weight; and said water has a content of 30 to 90% by weight each based on the whole amount of the ink composition.

9. A water base ink composition, comprising: the colored resin fine particle water base dispersion liquid for a water base ink of claim 3; a water soluble organic solvent; and water.

10. The water base ink composition as described in claim 9, wherein said colored resin fine particle water base dispersion liquid for a water base ink has a content of 3 to 30% by weight of resin solids; said water soluble organic solvent has a content of 5 to 80% by weight; and said water has a content of 30 to 90% by weight each based on the whole amount of the ink composition.

11. A water base ink composition, comprising: the colored resin fine particle water base dispersion liquid for a water base ink of claim 4; a water soluble organic solvent; and water.

12. The water base ink composition as described in claim 11, wherein said colored resin fine particle water base dispersion liquid for a water base ink has a content of 3 to 30% by weight of resin solids; said water soluble organic solvent has a content of 5 to 80% by weight; and said water has a content of 30 to 90% by weight each based on the whole amount of the ink composition.

13. A water base ink composition for a writing tool, comprising: the colored resin fine particle water base dispersion liquid for a water base ink of claim 1; a water soluble organic solvent; and water.

14. The water base ink composition for a writing tool as described in claim 13, wherein said colored resin fine particle water base dispersion liquid for a water base ink has a content of 3 to 30% by weight of resin solids; said water soluble organic solvent has a content of 5 to 80% by weight; and said water has a content of 30 to 90% by weight each based on the whole amount of the ink composition.

15. A water base ink composition for a writing tool, comprising: the colored resin fine particle water base dispersion liquid for a water base ink of claim 2; a water soluble organic solvent; and water.

16. The water base ink composition for a writing tool as described in claim 15, wherein said colored resin fine particle water base dispersion liquid for a water base ink has a content of 3 to 30% by weight of resin solids; said water soluble organic solvent has a content of 5 to 80% by weight; and said water has a content of 30 to 90% by weight each based on the whole amount of the ink composition.

17. A water base ink composition for a writing tool, comprising: the colored resin fine particle water base dispersion liquid for a water base ink of claim 3; a water soluble organic solvent; and water.

18. The water base ink composition for a writing tool as described in claim 17, wherein said colored resin fine particle water base dispersion liquid for a water base ink has a content of 3 to 30% by weight of resin solids; said water soluble organic solvent has a content of 5 to 80% by weight; and said water has a content of 30 to 90% by weight each based on the whole amount of the ink composition.

19. A water base ink composition for a writing tool, comprising: the colored resin fine particle water base dispersion liquid for a water base ink of claim 4; a water soluble organic solvent; and water.

20. The water base ink composition for a writing tool as described in claim 19, wherein said colored resin fine particle water base dispersion liquid for a water base ink has a content of 3 to 30% by weight of resin solids; said water soluble organic solvent has a content of 5 to 80% by weight; and said water has a content of 30 to 90% by weight each based on the whole amount of the ink composition.

21. A water base ink composition for an ink jet recording apparatus, comprising: the colored resin fine particle water base dispersion liquid for a water base ink of claim 1; a water soluble organic solvent; and water.

22. The water base ink composition for an ink jet recording apparatus as described in claim 21, wherein said colored resin fine particle water base ink has a content of 3 to 30% by weight of resin solids; said water soluble organic solvent has a content of 5 to 80% by weight; and said water has a content of 30 to 90% by weight each based on the whole amount of the ink composition.

23. A water base ink composition for an ink jet recording apparatus, comprising: the colored resin fine particle water base dispersion liquid for a water base ink of claim 2; a water soluble organic solvent; and water.

24. The water base ink composition for an ink jet recording apparatus as described in claim 23, wherein said colored resin fine particle water base dispersion liquid for a water base ink has a content of 3 to 30% by weight of resin solids; said water soluble organic solvent has a content of 5 to 80% by weight; and said water has a content of 30 to 90% by weight each based on the whole amount of the ink composition.

25. A water base ink composition for an ink jet recording apparatus, comprising: the colored resin fine particle water base dispersion liquid for a water base ink of claim 3; a water soluble organic solvent; and water.

26. The water base ink composition for an ink jet recording apparatus as described in claim 25, wherein said colored resin fine particle water base dispersion liquid for a water base ink has a content of 3 to 30% by weight of resin solids; said water soluble organic solvent has a content of 5 to 80% by weight; and said water has a content on the whole amount of the ink composition.

27. A water base ink composition for an ink jet recording apparatus, comprising: the colored resin fine particle water base dispersion liquid for a water base ink of claim 4; a water soluble organic solvent; and water.

28. The water base ink composition for an ink jet recording apparatus as described in claim 27, wherein said colored resin fine particle water base dispersion liquid for a water base ink has a content of 3 to 30% by weight of resin solids; said water soluble organic solvent has a content of 5 to 80% by weight; and said water has a content of 30 to 90% by weight each based on the whole amount of the ink composition.

* * * * *